(12) United States Patent
Hujanen et al.

(10) Patent No.: US 8,648,210 B2
(45) Date of Patent: Feb. 11, 2014

(54) METHOD FOR PURIFYING LIPID MATERIAL

(75) Inventors: Mervi Hujanen, Helsinki (FI); Annika Malm, Helsinki (FI); Reijo Tanner, Hikia (FI)

(73) Assignee: Neste Oil Oyj, Espoo (FI)

( * ) Notice: Subject to any disclaimer, the term of this patent is extended or adjusted under 35 U.S.C. 154(b) by 286 days.

(21) Appl. No.: 13/117,185

(22) Filed: May 27, 2011

(65) Prior Publication Data

US 2012/0116103 A1  May 10, 2012

Related U.S. Application Data

(60) Provisional application No. 61/411,145, filed on Nov. 8, 2010.

(30) Foreign Application Priority Data

Nov. 8, 2010  (EP) .................................... 10190309

(51) Int. Cl.
*C11B 3/00* (2006.01)
(52) U.S. Cl.
USPC .................. 554/175; 554/177; 554/8; 554/9; 554/20; 554/23; 554/29; 554/207; 554/210
(58) Field of Classification Search
None
See application file for complete search history.

(56) References Cited

U.S. PATENT DOCUMENTS

| | | | |
|---|---|---|---|
| 4,341,038 A | 7/1982 | Bloch et al. | |
| 4,857,329 A | 8/1989 | Sako et al. | |
| 5,677,472 A | 10/1997 | Nybeg et al. | |
| 5,750,180 A | 5/1998 | Heidlas et al. | |
| 6,063,946 A | * 5/2000 | Miller et al. | 554/167 |
| 6,127,560 A | 10/2000 | Stidham et al. | |
| 2005/0113588 A1 | 5/2005 | Hillion et al. | |
| 2007/0218175 A1 | 9/2007 | Chou et al. | |
| 2009/0266743 A1 | 10/2009 | Yao et al. | |

FOREIGN PATENT DOCUMENTS

| | | |
|---|---|---|
| AU | 2007203074 | 7/2007 |
| EP | 2097496 | 12/2010 |
| WO | 0036059 | 6/2000 |

(Continued)

OTHER PUBLICATIONS

Kalbasi-Ashtari et al., "Oat Oil: Refining and stability", Journal of the American Oil Chemists' Society, Aug. 1, 1977, 54(8):305-307.

(Continued)

*Primary Examiner* — Yate K Cutliff
(74) *Attorney, Agent, or Firm* — Andrus Intellectual Property Law, LLP (57) ABSTRACT

The present invention relates to a method for purification of lipid material originating from biological material. In the method the lipid material comprising acylglycerols and phosphorus impurities and at least one added nonpolar solvent and at least one added polar solvent is provided into a reaction zone whereby at least a two phase system comprising a nonpolar phase and a polar phase is formed. The phase system is heated in the closed reaction zone under mixing at a temperature from 150° C. to 300° C. and at a pressure wherein said solvents are in subcritical state, preferably of below 100 bar, dependent on the vapor pressure of the selected solvents, until the phosphorus impurity is removed from the polar phase. Subsequently, the nonpolar phase including the purified oil comprising acylglycerols is separated and recovered from said phase system.

19 Claims, 1 Drawing Sheet

(56) References Cited

FOREIGN PATENT DOCUMENTS

| | | |
|---|---|---|
| WO | 2008034109 | 3/2008 |
| WO | 2008134836 | 11/2008 |
| WO | 2010000416 | 1/2010 |
| WO | 2010089063 | 8/2010 |
| WO | 2010104444 | 9/2010 |
| WO | 2011025616 | 3/2011 |

OTHER PUBLICATIONS

European Search Report for EP11167858 dated Feb. 14, 2012.
International Search Report for PCT/FI2011/050986 dated Feb. 10, 2012.
Written Opinion for PCT/FI2011/050986 dated Feb. 10, 2012.
EP Search Report for EP Application No. 10190309.4-1221, dated Apr. 17, 2011.

* cited by examiner

METHOD FOR PURIFYING LIPID MATERIAL

FIELD OF THE INVENTION

The present invention relates to a method for purification of lipid material of biological origin. Especially, purified oil suitable for use as feedstock in the production of a renewable fuel component is obtained by the present method.

BACKGROUND OF THE INVENTION

Today liquid fuel components are mainly based on crude oil. There is an ever growing demand for liquid fuels with lower $CO_2$ emissions compared to crude oil based fuels. Various renewable sources have been used as alternatives for crude oil fuels.

Vegetable oils and animal based fats can be processed for use as liquid biofuels in the form of fatty acid esters or hydrocarbons. Lipids for use in biofuels can also be produced in microorganisms such as algae, fungi and bacteria.

A typical problem with the use of animal based fats or vegetable oils, in particular microbial oils for liquid fuel production, is that they tend to contain significant amounts of metal and phosphorus impurities. These undesirable impurities are difficult to remove from renewable source material without simultaneously removing some of the valuable components. The impurities cause problems, for example, in the fuel production in form of catalyst poisons and/or corrosive materials. Deposits of metal and phosphorus compounds are likely to result in catalyst deactivation and plugging of the reactor catalyst bed in refining processes. In addition to phosphorus and metals animal fats frequently further contain thousands of ppms nitrogen which is hard to remove by existing pretreatment procedures.

Therefore, it is often required to use pretreatment steps or precleaning for removal of these undesired components from the oil product. Common treatment methods such as water degumming, soft degumming, acid degumming, wet bleaching and dry bleaching, for example, are able to remove most of the phospholipids and their salts from the feed stream. A disadvantage in using these methods is that a notable amount of feed which could be reformed into fuel is lost. In a degumming process especially phospholipids as well as metal impurities are removed in the form of gums. The formed gums contain significant amount of lipid material in the form of complex lipids thus decreasing the yield in fuel production. Other compounds used in oil purification like bleaching earth may become annoying waste that is difficult and expensive to handle, and simultaneously valuable agricultural fertilizer components are lost.

Microorganisms such as algae, archaea, bacteria and fungi including filamentous fungi and yeast may contain triglycerides up to 80% of their total dry matter content. However, oil from microbial biomass which is suitable as precursor for fuel production is scarce on the market. This is mainly due to lack of efficient and economical methods for providing good quality oil from microbial biomass. The typical drawbacks are high impurity contents and/or low yield.

When microbial biomass is used as feedstock the high amount of phospholipids i.e. membrane lipids from the total lipid content complicates the treatment even more. These lipids are typically in the form of metal salts additionally providing high metal content into oil. Traditionally, these phospholipids as such have been removed before further processing whereby usable lipid content is lost. The extraction of oil at a high temperature produces oil with less impurities. However, many valuable ingredients contained in microbial and algal biomasses are destroyed at these high temperatures. Therefore, in order to preserve the value of the residual biomass, the oil extraction should be carried out at mild temperature conditions. Unfortunately, the oil resulting from solvent extraction in mild process temperatures of, for example, 20° C.-150° C. usually results in a product rich in metals and phosphorus impurity content. These type of oils can also be very difficult to handle and purify by traditional means such as degumming because of the presence of emulsifying compounds, such as high level of phospholipids. Merely, the typical high original amount of phospholipid in algal oil results in decreasing the oil yield when using degumming resulting in inoconomical processing.

US2009/0266743 discloses a method for thermally treating triglyceride or triglyceride/hydrocarbon mixture for decreasing the metal and phosphorus content. In this method hydrocarbon which has a boiling point from about 25° C. to about 760° C. including a large variety of hydrocarbon compounds and mixtures and a triglyceride are passed through a heating zone. The temperature in this zone is from about 40° C. to about 540° C. A feed is produced which is contacted with a hydrotreating catalyst in a reaction zone to produce a reaction product containing diesel boiling range hydrocarbons.

WO2008034109 discloses a method for recovering fatty acids in form of alkyl esters from microbial biomass, such as microalgae, bacteria and fungi. The wet biomass is treated at high temperatures up to 450° C. and elevated pressure, such as up to 40 MPa (about 400 bar). This high temperature treatment aims at and results in disruption of the cells and formation of an oily phase. An alcohol, such as methanol or ethanol, is added to the oily phase and reacted therewith forming alkyl esters (FAME or FAEE). Co-solvents, such as alkanes, and catalyst, such as organic acids, can be used. Esterification reactions require essentially water free environment and high amount of alcohol present.

Degumming is the process of removal of phospholipids, including gums, typically from vegetable crude oil or edible oil wherein they are dissolved. Especially hydratable phospholipids may be removed by treatment with hot water. Oil containing non-hydratable phospholipids require use of an acid, such as phosphoric acid. Vegetable oils wherefrom hydratable phosphatides have been eliminated by a aqueous degumming process, may be freed from non-hydratable phosphatides by for example enzymatic treatment.

Total hydrolysis of lipids to obtain free fatty acids is well known and can be performed, for example, by treatment with water i.e. hydrotreatment. Acylglycerols and phospholipids have been successfully split or decomposed by hot pressurized water into free fatty acid. Water simultaneously splits phospholipids and glycerides to phosphate, glycerol and free fatty acids. However, free fatty acids are known to be corrosive and causing problems in subsequent processing. Therefore, extensive formation of free fatty acids should be avoided.

EP2097496 discloses a process for direct conversion of lipidic biomass to a transportation fuel. In this process lipidic biomass comprising glycerides or materials resulting in triglycerides is thermally hydrolysed with liquid water at about 220-300° C. Glycerides and other oily components are totally decomposed into free fatty acids and glycerol. The obtained free fatty acids are processed further into jet fuel, gasoline or diesel and glycerol is used as a combustable heat source in the treatment process.

Prior art provides means for treating oily biomass by conversion into esters or splitting into free fatty acid. However, it would be preferred to obtain as high glyceride content for the recovered oil as possible because of the corroding nature of free fatty acids.

On the other hand, problematic phospholipids and other complex lipids can be completely removed by degumming, which however significantly lowers the yield. In degumming the complete complex lipid is removed intact i.e. without decomposition or structural decay thus lowering the yield of lipidic material suitable for feedstock in further fuel production. For example, phospholipids typically contain two long chain fatty acids which are attached to the glycerol back bone and are suitable for feedstock in fuel production. There remains a need for recovery of the lipid components as intact as possible from the phospholipids to enhance the overall quality of the recovered usable oil fraction.

SUMMARY OF THE INVENTION

The object of the present invention is to provide a method for efficient removal of impurities such as metals and phosphorus from lipids originating from biological materials, especially without lowering the yield of glyceridic material.

Another object of the present invention is to provide a method for efficient removal of impurities such as metals and phosphorus from biological materials comprising high amounts thereof.

Yet, another object of the present invention is to maximize the quality and amount of purified lipids to be obtained.

And yet, another object of the present invention is to provide a method for producing lipids suitable for use in catalytic refining processes for the production of various hydrocarbon components, biofuel and renewable diesel.

Phospholipids typically tend to accumulate into the oil phase together with the neutral lipids especially when extracting vegetable or microbial biomass containing high amount of the phospholipids.

According to an aspect of the present invention a mild heat treatment to lipid material together with a suitable amount of polar solvent such as water and nonpolar solvent such as heptane is effective in the removal of phosphorus and metal impurities for producing purified oils.

Hydrolysis of lipids is mainly a function of temperature, pH and time. It was surprisingly found that when the lipids are diluted in nonpolar solvent before subjecting them to elevated temperature essentially no hydrolysis of the nonpolar lipids occur. However, the vicinity of the water-solvent surface layer and thus the presence of water increased the degree of phospholipid hydrolysis. Therefore, in the method of the present invention the nonpolar lipid tails are not essentially decomposed into free fatty acids but merely remain in glyceride form. Thus, selective hydrolysis of phospholipids resulting in a glyceride product with a low level of phosphorus and metals is obtained. The phosphorus is recovered as a solid metal phosphate and these beneficial nutrients may be recycled back to e.g. algal cultivation.

Nutrient, especially phosphorus, recycling is a major concern in the proposed algal to biofuel process and the present invention provides an effective way to remove the phosphorus from the oil without a loss of the valuable lipid tails.

In the method of the present invention a need for pre or post processing for removal of phospholipids before the refining steps is avoided.

DETAILED DESCRIPTION OF THE INVENTION

The present invention relates to a method for treatment of renewable lipid material, more specifically to a method for purification of lipid material, wherein the oil or lipid comprised in said lipid material originates from biological material. The purified oil obtained by the method is suitable for use in fuel production.

By the term "glyceride" is meant esters formed from glycerol and fatty acids also known as acylglycerols.

By the term "renewable" is meant oil which originates from a source other than crude oil i.e. from biological material such as plant, animal and/or microbiological material.

More specifically, the present invention aims at removal of phosphorus and metal impurities from lipid material in a way that acylglycerols thereof stay essentially intact and there is very little yield loss in the recovered oil fraction. The chemical composition of the acylglycerols is in essence maintained i.e. for example triacylglycerols (TAGs) are not converted into free fatty acids. Virtually, none or only a small portion of the acylglycerols present is chemically modified.

By "complex lipid" is meant lipid material containing a further element in addition to C, H and O and/or having a carbohydrate attached to the lipid. Typically, these elements comprise phosphorus and nitrogen. Complex lipids are, for example but not limited to, phospholipids, sphingolipids and glycolipids.

By "biological material" is meant renewable organic material containing oil, fats and/or lipids in general, which may be used for oil recovery. This expression excludes oily components of mineral oil in all its form or origin.

By the term "lipid" is meant a fatty substance, the molecule of which generally contains at least partly an aliphatic hydrocarbon chain, which dissolves in nonpolar organic solvents but is poorly soluble in water. Lipids are an essential group of large molecules in living cells. Lipids comprise, for example, fats, oils, waxes, wax esters, sterols, terpenoids, isoprenoids, carotenoids, polyhydroxyalkanoates, fatty acids, fatty alcohols, fatty acid esters, phospholipids, glycolipids, sphingolipids and acylglycerols, such as monoglycerols (monoacylglycerol, MAG), diglycerols (diacylglycerol, DAG) or triglycerols (triacylglycerol, TAG). The term lipid material further means material that comprises an oil component which may be separated and recovered.

In the embodiments of the present invention lipids to be treated include fats, oils, waxes and fatty acids and their derivatives which are convertible into liquid form at the processing conditions used.

The treatment method according to embodiments of the present invention comprises at least the following steps:

a. Providing lipid material comprising acylglycerols and phosphorus impurities and at least one added liquid nonpolar solvent and at least one added liquid polar solvent into a reaction zone whereby at least a two phase system is formed. Thus two phase system comprises a nonpolar phase and a polar phase.

b. Heating said phase system in the closed reaction zone under mixing at a temperature from 150° C. to 300° C. The impurity content is still undesirably high if temperature is lower than 150° C. and if the temperature is risen above 300° C., for example, acylglycerols tend to decompose. Preferably, the treatment temperature is from 160° C. to 260° C. wherein a reasonable metal and phosphorus impurity content for fuel component applications is reached and no essential decomposition of acylglycerols takes place. The treatment is perfomed at a pressure wherein said solvents are in subcritical state, preferably of below 100 bar dependent on the vapor pressure of the selected solvents, until the phosphorus impurity is removed from the nonpolar phase.

c. Separating and recovering from said phase system said nonpolar phase including the purified oil comprising acylglycerols.

In embodiments of the present invention lipid material to be treated preferably originates from biological material such as from plants, animals or microorganisms.

According to a preferred embodiment the biological plant material is a vegetable oil plant. Preferably, the lipid material originating from these vegetable oil plants are seed oils, vegetable oils, fruit oils or pine oils. More preferably, plant material is selected from rapeseed, canola, soybean, palm, cotton, sunflower, corn, camelina, jatropha, hemp and used cooking oil. Vegetable oils generally contain quite low levels of phospholipids, less than 5 wt %, and lower metal impurities than e.g. algal oil.

According to another preferred embodiment the material originating from animals comprises animal fat, preferably rendered animal fat. Rendering can refer to any processing of animal byproducts into more useful materials, or at least to the rendering of whole animal fatty tissue into purified fats. A rendering process typically yields a fat commodity such as yellow grease, white grease, bleachable tallow or the like. Animal fat in embodiments of the present invention is preferably selected from beef, pork, sheep, and/or poultry lard, tallow, butter and/or fat.

According to yet another preferred embodiment the biological material is obtained from microorganisms. Preferred microorganisms are algae, such as microalgae, bacteria, fungi, including filamentous fungi and yeasts; more preferably algae and fungi, most preferably algae. Especially algae oil purification is challenging compared to e.g. rape seed oil purification due to high original impurity content but yet successfully carried out by the method according to embodiments of the present invention.

Most preferred algae are microalgae capable of incorporating high lipid content such as microalgae genera comprising *Achnantes, Amphiprora, Amphora, Ankistrodesmus, Attheya, Boeklovia, Botryococcus, Biddulphia, Brachiomonas, Bracteococcus, Carteria, Chaetoceros, Characium, Chlamydomonas, Crypthecodinium, Cryptomonas, Chiorella, Chlorococcum, Chrysophaera, Coccochioris, Cocconeis, Cyclotella, Cylindrotheca, Dunaliella, Ellipsoidon, Entomoneis, Euglena, Eremosphaera, Extubocellulus, Franceia, Fragilaria, Gleothamnion, Hantzschia, Haematococcus, Hormotilopsis, Hymenomonas, Isochrysis, Lepocinclis, Melosira, Minidiscus, Micractinum, Monallanthus, Monoraphidium, Muriellopsis, Nannochloris, Nannochloropsis, Navicula, Neochloris, Nephroselmis, Nitzschia Ochromonas, Oedogonium, Oocystis, Papiliocellulus, Parachlorella, Pascheria, Pavlova, Peridinium, Phaeodactylum, Plankthothrix, Platymonas, Pleurochrysis, Pleurosigma, Porphyridium, Prymnesium, Pseudochlorella, Pyramimonas, Pyrobotrus, Radiosphaera, Rhodomonas, Rhodosorus, Sarcinoid, Scenedesmus, Schizochytrium, Scrippsiella, Seminavis, Skeletonema, Spirogyra, Stichococcus, Synedra, Tetraedron, Tetraselmis, Thalassiosira, Trachyneis, Traustrochytrium, Trentepholia, Ulkenia, Viridiella*, and *Volvox*.

Preferred microorganisms further comprise cyanobacteria and especially cyanobacteria selected from the group of *Agmenellum, Anabaena, Anabaenopsis, Arthrospira, Dermocarpa, Gleocapsa, Microcystis, Nodularia, Nostoc, Oscillatoria, Plectonema, Phormidium, Spirulina Synechococcus, Synechocystis* and *Xenococcus*.

Preferred fungal species are genera *Aspergillus, Mortierella, Chaetomium, Claviceps, Cladosporidium, Cunninghamella, Emericella, Fusarium, Glomus, Mucor, Paecilomyces, Penicillium, Pythium, Rhizopus, Trichoderma, Zygorhynchus, Humicola, Cladosporium, Malbranchea, Ustilago*. Preferred bacteria are those belonging to the genera *Acinetobacter, Actinobacter, Alcanivorax, Aerogenes, Anabaena, Arthrobacter, Bacillus, Clostridium, Dietzia, Gordonia, Escherichia, bacterium, Micrococcus, Mycobacterium, Nocardia, Nostoc, Oscillatoria, Pseudomonas, Rhodococcus, Rhodomicrobium, Rhodopseudomonas, Shewanella, Shigella, Streptomyces* and *Vibrio*.

Preferred oleaginous yeast are those belonging to genera *Clavispora, Deparyomyces, Pachysolen, Kluyveromyces, Galactomyces, Hansenula, Saccharomyces, Waltomyces, Endomycopsis, Cryptococcus*, such as *Cryptococcus curvatus, Rhodosporidium*, such as *Rohodosporidium toruloides, Rhodotorula*, such as *Rhodotorula glutinis, Yarrowia*, such as *Yarrowia lipolytica, Pichia*, such as *Pichia stipitis, Candida* such as *Candida curvata, Lipomyces* such as *Lipomyces starkeyi* and *Trichosporon* such as *Trichosporon cutaneum* or *Trichosporon pullulans* which readily accumulate lipids or have been genetically modified to produce lipids.

There are at least two types of lipid material which are preferably used in the present method. One is impure oil typically directly originating from biomass and requires purification before further processing. Main contaminants are metal impurities and phospholipids. The other type is oil containing residue or waste i.e. an oily residue or waste from a purification process such as extraction wherein the material that still contains oil but cannot be directly recycled and needs to be removed from the process. This waste material typically originates from oil extraction or purification processes and contains high amounts of impurities such as phosphorus and metals but also lipid material in the form of acylglycerols that can be used as feedstock in fuel production. The present method is capable of recovering pure lipid material from the oily waste material and increasing the yield. Preferably, the oily waste material originates from a degumming process.

Depending on the feed the treatment comprises recovery of oil from oily residue or purification of oil from impurities residing therein.

In the first method step of embodiments of the present invention lipid containing feed material is provided into a reaction zone. Characteristic for this lipid feed material is that it comprises acylglycerols and phosphorus impurities. In addition to these components the lipid material preferably contains other glycerides, more preferably triacylglycerols (TAGs), diacylglycerols (DAGs), monoacylglycerols (MAGs) and possibly some free fatty acids. The amount of glycerides and free fatty acids is dependent on the origin of the oil.

The lipid material to be treated may also be solid or semisolid such as fats. In order to perform an efficient treatment the oil to be purified should be readily dissolvable in the nonpolar solvent at the processing temperature and pressure. The purified oil is recovered dissolved in the nonpolar solvent. Impurities are removed from the nonpolar phase together with the polar phase or as solid.

In a preferred embodiment the phosphorus impurities originate from complex lipids.

The complex lipids contained in the lipid feed material comprise preferably phospholipids. It may further comprise sphingolipids and/or glycolipids. These lipids are the main source for phosphorus, metal and/or nitrogen impurities in vegetable oils. The amount of phospholipids is especially high when algal crude oil is used as lipid feed.

In a preferred embodiment the lipid feed material contains at least 1% by weight phospholipids.

In another embodiment the lipid feed material contains at least 10% by weight phospholipids.

In a yet other embodiment the lipid feed material contains at least 50% by weight phospholipids.

The amount of phospholipids in algae crude oil feed material may be even up to 90% by weight of the oil therein.

The algae oil to be purified may further contain carbohydrates, proteins, nucleic acids, solid residues, salts chlorophylls, and other pigments. Moreover, said algae oil may contain moisture originating, for example, from sea water which can carry impurities.

According to one embodiment the lipid material to be treated is purified before treatment by using water degumming in order to recover the valuable lecithin.

Together with the lipid feed at least one liquid nonpolar solvent and at least one liquid polar solvent are added into said reaction zone together with the lipid feed material. Together all these components form at least a two phase system including a polar phase such as an aqueous phase and nonpolar oily phase.

In one embodiment when there is present an oily residue from the degumming process a further phase emerges and a three phase system is formed including a phase of solid gums, a polar phase and a nonpolar phase.

In a preferred embodiment the lipid material is first diluted by the nonpolar solvent and subsequently polar solvent is added to this mixture. The nonpolar solvent readily dissolves the neutral oil present in the lipid material and thus prevents hydrolysis of it when adding the polar solvent.

Suitable nonpolar solvents for use in embodiments of the present invention are nonpolar organic solvents. The nonpolar solvent is preferably capable of dissolving the neutral oil comprised in the lipid feed material and produced during the treatment in hydrolysis of the more polar components, more preferably dissolving the oil essentially completely. It is furthermore preferred that said nonpolar solvent is more preferably essentially totally immiscible with the polar solvent enabling hydrolysis only at the interphase. The miscibility with a polar phase results in yield loss and possible difficulties in phase separation. Solvents fulfilling these criteria comprise aliphatic or cyclic alkanes of $C_3$-$C_{20}$ or mixtures thereof. Preferably $C_5$-$C_{16}$ alkanes or mixtures thereof are used because of their suitable vapor pressure, which allows the solvent to be separated from the lipid material more efficiently. Most preferred alkanes comprise hexane, heptane or octane or mixtures thereof. One favourable solution is to provide as a nonpolar solvent an alkane product produced in the same manufacturing facility, or otherwise readily available at the plant.

According to one preferred embodiment the nonpolar solvent is a product from hydrodeoxygenation process, for example, a product obtained from subsequent hydrodeoxygenation process after purification of the oil whereby a recycle stream may be used.

According to one embodiment mixture of alkanes suitable for oil refining and different gasoline distillation fractions may be used. Preferably, these fractions contain hexane, heptanes, octane or mixtures thereof. An example for a preferred suitable solvent is refinery petroleum distillation fractions like low aromatic or aromatic free hydrocarbon solvent mixtures such as NESSOL LIAV 110 (bp. 85-110° C., available from Neste Oil), LIAV 230 (bp. 175-225° C., available from Neste Oil) and the like. NESSOL is a registered trade mark of Neste Oil Oyj, Finland.

In the method according to embodiments of the present invention the ratio of said lipid material to said nonpolar solvent is preferably less than 10:1 which is economically advantageous. The ratio is more preferably less than 1:1 for efficiently preserving the glyceridic oil, most preferably less than 1:5, most preferably 1:10 in order to effectively prevent the triacylglycerols or other neutral glyceridic oil from decomposing and hydrolyzing.

The polar solvent to be added is preferably a solvent capable of functioning as a carrier medium for the polar group of said complex lipid. Without being bound by any theory, it has been found advantageous for the process that there is a clear interphase between the nonpolar and the polar phase, enabling more efficient phase transitions of the impurities. For example, in case of phospholipid as complex lipid the molecule contains a hydrophobic tail i.e. long fatty acid hydrocarbon tail and a hydrophilic head i.e. negatively charged phosphate group, and possibly other polar groups. The uncharged hydrophobic tail is drawn to the nonpolar solvent phase whereas the polar hydrophilic head of the molecule is attracted by the polar solvent. Typically, when placed in water, for example, phospholipids form a variety of structures depending on the specific properties of the phospholipid.

In a preferred embodiment the polar solvent comprises water or more preferably is water. This is the most economical choice. However, a mixture of water and an alcohol readily soluble in water is advantageous in some cases due to increased capacity of the solvent to remove other than oil impurities, such as carbohydrates. Most preferably, the alcohol is selected from methanol, ethanol and a mixture thereof. Addition of organic acids which are considered to effectively acidify the polar phase is advantageous in some cases. Hydrolysis is enhanced in acid conditions but too acidic conditions result in unwanted hydrolysis of the triglycerides. The pH of the polar phase is preferably between 3 and 10.

In the method according to embodiments of the present invention the ratio of the combined amount of said lipid material to said polar solvent is preferably more than 1:10 in order to ensure good contact with the nonpolar phase. The ratio is more preferably more than 1:5 to enable effective mixing of the two phases, most preferably equal to or more than 1:1, most preferably 5:4, or even such as 10:1. A low solvent ratio is advantageous to avoid a large recirculation volume.

In the first step of the method according to embodiments of the present invention all components are provided to the reaction zone which resides in a closed environment such as a reactor able to withstand the reaction conditions required.

In the seconds step the formed phase system is heated in this closed reaction zone under mixing, preferably constant mixing. The temperature needs to be carefully controlled and maintained at about from 150° C. to 300° C., preferably from 160° C. to 260° C., to ensure that on the other hand minimal degree of decomposition or pyrolysis takes place at the higher end thus enabling the preservation of acylglycerols, such as TAGs, intact and on the other hand effective removal of impurities is obtained. The pressure building up in this closed system depends on the treatment temperature chosen and the provided oil and solvents. Typically, the pressure is such that the solvents are in subcritical stage depending on the nature of the used solvents. Preferably, the pressure is below 100 bar depending on the vapor pressure of the selected solvents. Constant mixing is highly advantageous to ensure good interfacial contact between the two phases and materials dissolved therein. During constant mixing at the chosen temperature and pressure the polar group of the complex lipid is essentially detached from the uncharged portion.

The treatment temperature lower limit is preferably more than 165° C. due to enhanced purification and increased separation of phospholipids. More preferably, the lower limit is 180° C. due to increased separation of the metals such as Ca.

Most preferably, the lower limit is at least 190° C. for improving the detachment of the charged group of the phospholipid, such as 200° C. To some extent the treatment temperature is dependent on the origin of the oily material. Purification of oil is a function of both the resident time and temperature.

According to a preferred embodiment 30 min at 230° C. under mixing will remove more than 99,8% of phosphorus from oil.

The upper limit of the treatment temperature is preferably less than 300° C. due to increased decomposition of TAG taking place at higher temperatures. More preferably, the upper limit is less than 265° C., preferably less than 250° C., due to increased occurance of unwated side reactions at higher temperatures. Most preferably, the upper limit is less than 240° C. due to easier control of the pressure at lower temperatures, such as less than 230° C. To some extent the treatment temperature is dependent on the origin of the lipid material. Any combination of the treatment temperature ranges as set above may be chosen depending on the effects to be pursued.

In a preferred embodiment the temperature in the second step is from 210° C. to 230° C. for optimal performance.

Furthermore, the selection of optimal temperature or temperature range depends not only from the maximum yield of TAGs or phosphorus purity possible to obtain but also on the further use of the oil. For example, if the further use is in catalytic biofuel refining process it sets criteria for the catalyst poison i.e. metal and phosphorus content. It is not necessary to optimise the process further after reaching low enough values. Moreover, the quality of the recovered lipid, such as TAG content for example, varies depending on the processing parameters used.

In a preferred embodiment the temperature in the second step is from 200° C. to 260° C. with the provision that said oil originates from algae.

In another preferred embodiment the temperature in the second step is from 185° C. to 230° C. with the provision said oil originates from vegetable plant fat.

Pressure during treatment is elevated due to increased temperature as is typical in closed pressure vessels or reactors. The treatment pressure depends on the selected temperature, selected solvents i.e. the boiling points and vapour pressures thereof and the reactor dead volume. A skilled person is able to determine the pressure value based on theoretical calculation using these parameters. In a batch operation mode typically about 65% is effective volume whereas about 35% is dead volume. Preferably, the solvents are chosen with the provision of at least 95%, preferably 98%, more preferably 99%, thereof being in liquid phase. A preferred pressure range is from 2 to 100 bar, more preferably from 5 to 80 bar, most preferably from 10 to 70 bar, such as from 20 to 60 bar.

During the heat treatment step the mixing is preferably efficient enough to provide an efficient mixing of the two phases and for enabling good interfacial contact between the polar phase and the nonpolar phase and materials dissolved therein. Efficient mixing is preferably such that it enables the complex lipids to migrate towards the polar solvent and enhances the removal of the phosphorus. According to a preferred embodiment the mixing is performed by using a mixing efficiency up to about 500 rpm for a liter of water for 30 min, more preferably for 20 min.

Accoding to one embodiment of the present invention, in the second step of the method the at least two phase system further comprises solid impurities or solid phase residue is formed. During mixing of the provided components or the heat treatment at elevated pressure and constant mixing occationally a solid phase is formed. The formation of the solid phase depends on the origin of the oily material and the amount of impurities. Especially, when algae crude oil is to be purified the oil frequently contains considerable amounts of phospholipids resulting in high amounts of phosphorus impurities and metal impurities. During separation of polar and nonpolar components solid residue is often precipitated containing, for example, sparingly soluble salts. For example, rapeseed produces only modest residue due to low impurity content whereas algae oil produces pronounced amount of residue due to high impurity content. This solid phase residue may reside in the polar phase or in the nonpolar phase, or possible both phases have some residue therein. Thus, a distinct solid phase separates out from said system forming said third phase. Especially when the treated mixture is cooled down before removal from the reactor solid precipitate emerge during cooling. Occationally, solid precipitate forms already at the elevated temperature zone as some plugging of filters can be observed after treatment.

Oil, such as rapeseed oil, originating from plant oils containing relatively small amounts of phospholipids compared to, for example, algae oils are also less difficult to purify. Mono and divalent cations residing in or transported together with phospholipids can be effectively removed by the treatment according to embodiments of this invention compared to for example traditional degumming methods. Metallic impurities tend to accumulate in algal oils rendering the purication more challenging. A marked decrease in metal content during purification is observed using a method according to an embodiment of the present invention.

After the heat treatment under elevated pressure and constant mixing the formed nonpolar phase including the purified oil is recovered in the third step of the present method. This phase contains the purified oil dissolved in the nonpolar solvent.

The nonpolar phase can be separated from the polar phase and possible solid phase by generally known methods, such as settling, decanting or centrifugation. If solids residue in the nonpolar or polar phase they may be separated and collected by filtration or centrifugation. Preferably, the solid phase residue is separated by centrifugation.

In addition to previous steps the present method preferably further comprises a step for separating said purified oil from said nonpolar solvent of the nonpolar phase. More preferably, the separation is carried out by evaporation.

According to a preferred embodiment the nonpolar solvent used is recycled back to the first step after separation and recovery of the purified oil component.

According to another preferred embodiment the polar solvent used is recycled back to the first step after separation and recovery thereof.

The most striking advantage of the present method is observed in analysing the purified, separated and recovered oils. Results show that excellent lipid quality is maintained during the treatment. Only minor amount of TAGs or other glycerides such as DAGs or MAGs have been hydrolysed or converted into free fatty acids. Specifically, very low phosphorus content of oils originating from algae suggest that successful recovery of neutral lipids is possible from complex lipids otherwise totally removed in traditional purification.

The neutral portion of the complex lipids is recovered in the nonpolar oil phase and increases the oil yield.

In a preferred embodiment about 99%, preferably more than 99,5%, more preferably about 99,8%, of the phosphorus is removed from algae oil originally containing about 6000 ppm phosphorus.

The lipid material to be treated may further comprise nutrients such as nitrogen, potassium and/or phosphorus such as nutrients originating from algae cultivation and carried during harvesting and possible extraction into the algae crude oil. These can generally be recovered from the polar phase after treatment with this method.

According to a preferred embodiment the solid phase formed is recycled to cultivation as a nutrient, for example, to algal cultivation after separation and recovery thereof. Carbohydrates and protein residues from the crude oil are typically dissolved in the polar phase.

Using a method according to an embodiment of the present invention the metal content of the purified lipids or the mixture of lipids is lowered into about one twentieth or even one hundredth part of the content in lipids originally. The obtained lipid product contains clearly decreased amount of metals or metal salts. Metallic impurities may comprise Al, Ca, Mg, Fe, Cr, Cu, Mo, Na, Ni, Pb, Si, Sn, V, Zn, Mn which are detrimental for e.g. catalytic oil refining. According to embodiments of the present invention the total metal content is preferably decreased from several thousands of ppms into reasonable ranges such as a few hundred ppms for autotrophically cultured salt water algae, or less than 20 ppm, preferably less than 10 ppm, more preferably even less than 5 ppm, for heterotrophically grown species, vegetable or plant oil or animal fat depending on the temperature and solvent combination used.

In the present method the polar head containing phosphorous and nitrogen of the phospholipids is selectively removed from the lipid material or oil to be purified leaving the valuable fatty acids components in the oil in the form of DAGs or MAGs, minimizing the formation of free fatty acids. At the same time this separation has shown minimal effect on the amounts of MAGs, DAGs and especially TAGs residing in the nonpolar phase after treatment. Without being bound to any theory it seems that methods according to embodiments of the present invention is capable of selectively hydrolyzing the phosphorous head of phospholipids, but not hydrolyzing the fatty acids of TAGs, DAGs and MAGs, thereby minimizing the formation of free fatty acids. The present method is simultaneously capable of removing phosphorous by selective hydrolysis, and metals from lipidic material.

The treatment of the present method may be performed in industrial scale in continuous mode either counter currently or concurrently by modifying the apparatus and process details which is within the competence of a skilled person in the art.

In one embodiment the purified oil in the the nonpolar solvent is used as a mixture for catalytic biofuel refining processes.

A further advantage in the method according to embodiments of the present invention is that any oil can be treated at elevated temperature for removal of phosphorus and metal impurities. Dilution by a nonpolar solvent effectively suppresses or prevents the hydrolysis of lipids or oil.

A further aspect of embodiments of the present invention provides the use of the purified oil obtained by the above described method for production of biodiesel, renewable diesel, jet fuel, gasoline or base oil components. Preferably, the method according to an embodiments of the invention is used for purifying oil originating from autotrophic algae. Moreover, the method according to an embodiment the invention is preferably used for purifying oil originating from rapeseed, heterotrophic organisms, soybean or animal fat.

The invention and its embodiments are further illustrated by examples but not restricted thereto.

EXAMPLES

The pressure reactor used for the experiments was from Parr Instruments, model 4843. Heptane was n-heptane 99% pure (from J. T. Baker), ethanol was denatured and 99,5% pure (ETAX Ba, Altia).

Gas Chromatograph (GC) used in analysis was a 6890N from Agilent Technologies, and Ion Coupled Plasma (ICP) analyser was an Optima 7300 DV from Perkin Elmer. Gel Permeation Cromatography (GPC) was performed with a HPLC from Waters completed with three GPC-columns (Agilent Plgel 500, 100, 50 Å, 5 μm 7.8 mm×300 mm), a UV-detector (Waters 2996) and RI-detector (Waters 2414). IR-analysis was performed with a Nicolet Avatar 360 FT-IR (Nicolet).

Example 1

Rapeseed oil (*Raisio*) was purified by diluting it with heptane in a ratio of 1:3, and washing this oil-heptane solution with equal amount of water by stirring these components in a pressure reactor. In other words, a mixture of 40 g rapeseed oil, 120 g heptane, 160 g distilled water was mixed with a blade mixer in a 1 liter pressure reactor using a mixing efficiency of 500 rpm at varying temperatures for 30 min. Subsequently, the phases were separated by centrifugation. The upper non-polar phase was collected and the solvent heptane was evaporated therefrom in a rotavapor to recover the purified oil component.

The total amount of free fatty acids in the oil was determined by GC before and after the described treatment and after lipid saponification and methylation required for the GC sample preparation. The removal of phosphorus and metal impurities of the oils were analyzed by ICP. The lipid profile was analysed by GPC. The recovered and separated solids were analysed by IR after drying.

The rapeseed oil was purified with the described wash treatment at 190° C., 200° C., 210° C., 220° C. and 230° C.

The measured impurities of untreated and purified oils are presented in Table 1.

The amount of impurities in the oil decreased notably in the treatment. Heating at 230° C. purified the oil to the extent that the amount of all measured impurities were less than 1 ppm. Only 11% of the triacylglycerols (TAGs) had undergone hydrolysis and the purified oil contained only 4.5% free fatty acids (FFA). A brown solid residue could be separated by centrifugation. The residue contained phosphates and metals. The solid and water phase were free of fatty acids based on IR-analysis after a wash with heptane. In other words, all fatty acids were recovered in the heptane phase.

This example indicates that rapeseed oil is effectively purified with the thermal treatment using heptane and water with only low hydrolysis of TAGs.

TABLE 1

|  |  | Original rapeseed oil | Oil treated at 190° C. | Oil treated at 200° C. | Oil treated at 210° C. | Oil treated at 220° C. | Oil treated at 230° C. |
|---|---|---|---|---|---|---|---|
| TAG | wt-% | 95.2 | 91.3 | 91.3 | 90.6 | 84.5 | 84.9 |
| DAG | wt-% | 2.9 | 3.9 | 4.2 | 4.5 | 9.1 | 9.2 |
| MAG | wt-% | <0.1 | 0.1 | 0.1 | 0.1 | 0.4 | 0.4 |
| FFA | wt-% | 1.4 | 1.6 | 1.9 | 1.9 | 4 | 4.5 |
| lipid oligomers | wt-% | 0.4 | 3.1 | 2.5 | 2.8 | 2 | 1.1 |
| P | mg/kg | 264 | 17 | 2 | 1.3 | 1 | <0.6 |
| Ca | mg/kg | 209 | 22 | 0.8 | 0.6 | 0.9 | <0.1 |
| Mg | mg/kg | 49.6 | 1.3 | <0.3 | <0.3 | <0.3 | <0.3 |
| Fe | mg/kg | 15 | 4.3 | 0.4 | 0.3 | 0.3 | <0.1 |
| Na | mg/kg | <0.5 | <1.0 | <1.0 | <1.0 | <1.0 | <0.5 |

Values marked less than (<) a value means that the impurity was below the detection limit.

Example 2

Figure 1:
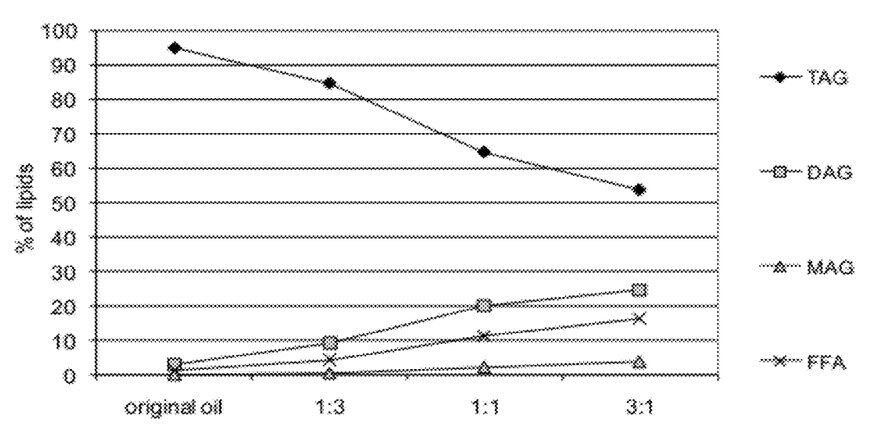
FIG. 1 shows the lipid quality in the original rapeseed oil before treatment and the oil treated at 230° C. with varying oil/heptane ratio.

The treatment for rapeseed oil described in Example 1 was performed at 230° C. by varying the oil-heptane ratios. The treatment was done at oil-heptane ratios 1:3, 1:1, and 3:1. The oil-heptane mixture had a mass of 160 g. The water amount used was equal to the nonpolar oil-heptane phase. On test was done with oil-heptane ratio 1:3 but with 5 wt-% water. The results are presented in Table 2 and. FIG. 1.

The result show that the oil diluted with the largest amount of non-polar solvent was hydrolysed the least in the treatment. When the treated oil was diluted in three parts heptane the decrease in TAG content was only 11%. When the oil contained 25% heptane, more than half of the TAGs (54%) were still unhydrolysed. When decreasing the amount of water from 50 wt-% to 5 wt-% there was slightly more TAGs unhydrolysed, however, only slightly more phosphorus (1.1 ppm) was left in the oil.

This example indicates that the nonpolar solvent protects the nonpolar oil from hydrolysis. The purification in view of phosphorus and metals was similar in all treatments at 230° C. In other words, it is beneficial to dilute the oil in a nonpolar solvent when hydrolysis of the oil is not desired and when purifying oils rich in TAGs.

This example demonstrates that when a product high in TAGs is required a purification treatment with the oil diluted in nonpolar solvent is required to prevent major hydrolysis of the lipids.

Table 2 shows the results for the rapeseed oil treated at 230° C. with different dilutions in heptane.

FIG. 1 shows the lipid classes in the original rapeseed oil and the oil treated at 230° C. with different oil/heptane ratio.

Example 3

*Nannochloropsis* oil, extracted from wet biomass at 100° C. with heptane and ethanol (3:1), was treated by diluting it with heptane in a ratio of 1:3, and treating this oil-heptane solution with water-ethanol (1:3) solution of equal mass in a stirred pressure reactor at set temperature. In other words, a mixture of 40 g oil, 120 g heptane, 40 g ethanol and 120 g distilled water was mixed in a 1 liter pressure reactor (mixing 500 rpm) at set temperature for 60 min. After this the phases were separated by centrifugation. The upper non-polar phase was collected and the solvent evaporated in a rotavapor to recover the purified oil.

The total fatty acids of oil before and after treatment was determined by GC after lipid saponification and methylation. Impurities of the oils were analyzed with ICP-analysis. The lipid profile was analysed by GPC-analysis. The separated solids were analysed by IR after drying.

This oil was purified with the described treatment at 200° C. and 225° C.

The impurities of the original and purified oils are presented in Table 3.

The level of phosphorus and metals decreased significantly in treatments above 200° C. In the wash at 200° C. the phosphorus content of the oil decreased by 65%, magnesium by 96%, sodium by 92% and calcium by 96%. In the wash at 225° C. the phosphorus content of the oil decreased by 99.5%,

TABLE 2

|  |  | Original rapeseed oil | Oil/hept/water 1:3:4 | Oil/hept/water 1:1:2 | Oil/hept/water 3:1:4 | Oil/hept/water 1:3:0.2 |
|---|---|---|---|---|---|---|
| TAG | wt-% | 95.2 | 84.9 | 64.9 | 53.9 | 87.8 |
| DAG | wt-% | 2.9 | 9.2 | 19.9 | 24.5 | 7.4 |
| MAG | wt-% | <0.1 | 0.4 | 2.2 | 3.8 | 0.2 |
| FFA | wt-% | 1.4 | 4.5 | 11.4 | 16.3 | 3.2 |
| lipid oligomers | wt-% | 0.4 | 1.1 | 1.6 | 1.6 | 1.5 |
| P | mg/kg | 264 | <0.6 | 1.1 | 0.9 | 1.1 |
| Ca | mg/kg | 209 | <0.1 | 0.3 | <0.3 | <0.3 |
| Mg | mg/kg | 49.6 | <0.3 | <0.3 | <0.3 | <0.3 |
| Fe | mg/kg | 15 | <0.1 | 1.1 | 0.8 | 0.4 |
| Na | mg/kg | <0.5 | <0.5 | <1.0 | <1.0 | <1.0 | magnesium by 99.9%, sodium by 99.5% and calcium by 99.9%.

This example indicates that oil is purified from phosphorus and minerals by heating the oil to temperatures above 200° C., preferably over 225° C. together with a polar solvent such as water or water-EtOH mixture.

The solid separating in the treatment at 200-225° C. was analysed to contain metal phosphates and found valuable for recycling back to the. cultivation.

Table 3 shows analysis results for original and treated *Nannochloropsis* oil

TABLE 3

|   |       | Original oil | Oil treated at 200° C. | Oil treated at 225° C. |
|---|-------|--------------|------------------------|------------------------|
| P  | mg/kg | 6000 | 1550 | 31.4 |
| Mg | mg/kg | 1620 | 49   | 1.1  |
| Na | mg/kg | 1640 | 208  | 8    |
| Ca | mg/kg | 1040 | 27   | 0.8  |

Example 4

The same *Nannochloropsis* oil as in Example 3 was treated at 230° C. diluted in heptane (oil-heptane ratio 1:3). The experiment was performed as in Example 3 with the difference that the polar solvent (in Example 3 water and EtOH) was varied in the different experiments to contain (1) water, (2) water-EtOH (3:1), (3) water with acidic pH (2.6) and (4) water with basic pH (9.5). Table 4 shows the analysis results for original and treated *Nannochloropsis* oil.

The impurities were lowered very significantly in all treatments. Very slight differences in level of impurities can be seen decreasing the water amount, adding alcohol or adjusting the pH of the water phase. Lowest phosphorus content (11.1 ppm) was gained with acidic water. The phosphorus content of the oil was thus lowered by 99.8%.

This example indicates that algal oil can be effectively purified by heat treatment diluted in heptane and with a polar solvent phase present during the treatment.

TABLE 4

|   |       | Original oil | Oil treated in heptane with water | Oil treated in heptane with 10× less water | Oil treated in heptane with water/EtOH (3:1) | Oil treated in heptane with water of pH 2.6 | Oil treated in heptane with water of pH 9.5 |
|---|-------|------|------|------|------|------|------|
| P  | mg/kg | 6000 | 16.9 | 16.9 | 19   | 11.1 | 14.9 |
| Mg | mg/kg | 1620 | 1    | 1.7  | 3    | <0.3 | 0.4  |
| Na | mg/kg | 1640 | 4.3  | 7.9  | 10   | 3.1  | 3    |
| Ca | mg/kg | 1040 | 1.1  | 2.3  | 2.3  | 1.3  | 0.8  |

Example 5

*Nannochioropsis* oils extracted with hexane was treated at 230° C. diluted in heptane (1:2) with added water (oil-heptane-water ratio 1:2:1) like described in Example 1. The results are shown in table 5.

The level of phosphorus was decresed significantly to 4 ppm. Also the level of sodium, magnesium and calcium was effectively reduced in the oil. This example indicates that the thermal treatment with water is very effective for purification of algal oil.

TABLE 5

|   |       | Original oil | Oil treated with heptane and water at 230° C. |
|---|-------|--------------|-----------------------------------------------|
| P  | mg/kg | 584  | 4   |
| Na | mg/kg | 483  | 1.1 |
| Ca | mg/kg | 19.2 | 2.2 |
| Mg | mg/kg | 219  | 0.7 |

Example 6

*Dunaliella* oil extracted from dry algal biomass with heptane at 160° C. was purified with the treatment as described in Example 3 at 200° C. and 220° C. The impurities of the original and purified oils are presented in table 6.

The impurities of the *Dunaliella* oil decreased notably. The level of phosphorus decreased with 66%, magnesium, sodium and calcium with over 95% in the treatment at 200° C. At 220° C. the phosphorus content decreased by 97%.

Algal oil of strain *Dunaliella* is significantly purified by this thermal treatment. Best results are obtained at a temperature of 220° C. or higher.

TABLE 6

|   |       | Original oil | Oil treated at 200° C. | Oil treated at 220° C. |
|---|-------|--------------|------------------------|------------------------|
| P  | mg/kg | 178 | 61 | 4.9 |
| Na | mg/kg | 308 | 2  | 1.2 |
| Ca | mg/kg | 108 | 5  | 1.8 |
| Mg | mg/kg | 136 | <1 | 0.3 |

Example 7

Dry *Rhodococcus* bacterial biomass was extracted with heptane at 100° C. The extracted oil was, however, quite high in phosphorus, sodium, magnesium and other minerals.

This oil was purified by diluting it with heptane in a ratio of 1:3, and treating this oil heptane solution with water-ethanol (1:3) solution at 200° C. as described in Example 3.

The impurities in the original and the treated oil are presented in table 7.

The impurities decreased significantly in the wash at 200° C.; phosphorus decreased with 96%. Also magnesium (88% decrease), sodium (98% decrease) and calcium (71% decrease) decreased in the process. The lipid composition did not change essentially from that of original extracted oil. Only minor hydrolysis of the oil was detected at 200° C.

This example indicates that bacterial oil with high phosphorus and metal impurities is purified significantly by treating the oil diluted in non-polar solvent with a polar water containing solvent at elevated temperature of 200° C. or higher.

TABLE 7

|  |  | Original oil | Oil treated at 200° C. |
|---|---|---|---|
| TAG | wt-% | 80.4 | 76.6 |
| DAG. | wt-% | 5 | 7.4 |
| MAG | wt-% | 0.8 | 0.8 |
| FFA | wt-% | 3.2 | 4.5 |
| lipid oligomers | wt-% | 10.6 | 10.6 |
| P | mg/kg | 569 | 21 |
| Mg | mg/kg | 122 | 15 |
| Na | mg/kg | 651 | 16 |
| Ca | mg/kg | 21 | 6 |

Example 8

Animal fat (Griffin Industries Inc.) was diluted with heptane (oil-heptane ratio 1:3) and with water as the polar solvent at 200° C. and 240° C. The treatment was performed as described in Example 1.

The impurities in the original and treated oils are presented in table 8.

The treatment with added water at 200° C. and 240° C. reduced the impurity content in the animal fat product significantly. Phosphorus was reduced to 6.3 ppm at 200° C. and was under the detection limit at 240° C. The animal fat treated at 240° C. had the major part (62%) of the TAGs unhydrolysed.

This example indicates that animal fat can be thermally treated together with water to reduce phosphorus and metal contents in the fat product significantly.

TABLE 8

|  |  | Original animal fat | Animal fat treated with heptane and water at 200° C. | Animal fat treated with heptane and water at 240° C. |
|---|---|---|---|---|
| TAG | wt-% | 81.3 | 70 | 53 |
| DAG | wt-% | 9.1 | 16 | 23.7 |
| MAG | wt-% | 0.6 | 1.1 | 2.8 |
| FFA | wt-% | 7 | 11.1 | 18.7 |
| lipid oligomers | wt-% | 2 | 1.8 | 1.8 |
| P | mg/kg | 95 | 6.3 | <0.6 |
| Na | mg/kg | 50 | 1 | 4.1 |
| Ca | mg/kg | 30 | 3.9 | 8.8 |
| Fe | mg/kg | 23 | 7 | 1.2 |
| Mg | mg/kg | 5 | 0.2 | 0.4 |

Example 9

Soybean oil (Control Union Argentina) was diluted with heptane (oil-heptane ratio 1:3) and treated with water as the polar solvent at 240° C. The treatment was performed as described in Example 1.

The impurities in the original and treated oils are presented in table 9.

The oil treated with added water was highly purified and contained less than 0.6 ppm of any measured metal impurities.

This example indicates the added purity to soybean oil was obtained when treating the oil with heptane and water at high temperature with minor hydrolysis of the TAGs.

TABLE 9

|  |  | Original oil | Oil treated at 240° C. |
|---|---|---|---|
| TAG | wt-% | 98 | 88.6 |
| DAG | wt-% | 1 | 7.7 |
| MAG | wt-% | 0.2 | 0.2 |
| FFA | wt-% | 0.8 | 4.8 |
| lipid oligomers | wt-% | <0.1 | 0.5 |
| P | mg/kg | 87 | <0.5 |
| Mg | mg/kg | 12 | <0.6 |
| Ca | mg/kg | 20.3 | <0.3 |
| Na | mg/kg | <0.5 | <0.5 |

Example 10

The treatment for rapeseed oil described in Example 1 was performed at 230° C. with the hydrodeoxygenation (HDO) product of palm oil (hydrocarbon mixture) instead of heptane as nonpolar solvent. The treatment was done at oil-HDO-product ratio 1:3. The oil-HDO-product mixture had a mass of 160 g. The water amount used was equal to the nonpolar oil-HDO-product phase. The water phase and solids were separated as described in example 1, but the oil was not separated from the nonpolar solvent. The analysis results for the purified oil-HDO-product are presented in table 10.

The oil-HDO-product mixture obtained was highly purified and contained less than 0.6 ppm of any measured metal impurities. This example indicates that oil can be treated diluted in hydrodeoxygenation product and yield a highly purified oil product suitable for catalytic conversion processes.

TABLE 10

|  |  | Untreated rapeseed oil/HDO-product (1:3) | Treated rapeseed oil/HDO-product (1:3) |
|---|---|---|---|
| FFA | wt-% | 0.35 | 0.75 |
| P | mg/kg | 66 | <0.6 |
| Ca | mg/kg | 52 | <0.3 |
| Mg | mg/kg | 12 | <0.3 |
| Fe | mg/kg | 4 | 0.2 |

Example 11

Commercial lecithin (granular lecithin, Acros Organics), which was analysed to contain 84% phospholipids, 14% neutral lipids (mono-, di-, triglycerides and free fatty acids) and 2% unidentified compounds, was diluted in heptane (16 g lecithin, 144 g heptane) and heated to 200° C. and 240° C. together with water (160 g) like described in Example 1.

The oil-heptane phase was separated on top of the water phase, filtered and heptane evaporated. The analysis results for the obtained oils are presented in Table 11.

At 200° C. 61% of the original lecithin was obtained as oil. At 240° C. 66% of lecithin was collected as oil. According to these results lecithin phospholipids are partly hydrolysed to di-, monoglycerides and free fatty acids, and the phosphate is partly converted to solid precipitate and water soluble phosphoric acid which was removed. All fatty acids from the original lecithin were recovered in the oil-heptane phase according to IR-analysis.

This example indicates that phospholipids can be thermally broken down and oil essentially free of phosphorus and minerals can be obtained from a material very high in phospholipids.

TABLE 11

|  |  | Original lecithin | Oil from treatment of lecithin at 200° C. | Oil from treatment of lecithin at 240° C. |
|---|---|---|---|---|
| phospholipids | wt-% | 84 | 6 | 0.5 |
| TAG | wt-% | 1.4 | 2.9 | 2.1 |
| DAG | wt-% | 8.8 | 37.2 | 36.6 |
| MAG | wt-% | 3.2 | 17.3 | 21.2 |
| FFA | wt-% | 0.3 | 36.6 | 38.5 |
| lipid oligomers | wt-% | 0.3 | 0 | 0.6 |
| P | mg/kg | 32700 | 2240 | 40.5 |
| Mg | mg/kg | 2500 | 28 | 1.4 |
| Ca | mg/kg | 1500 | 312 | 2.2 |
| Fe | mg/kg | 16 | 9.3 | 2.4 |

Example 12

Rapeseed oil gums obtained from acid degumming of rape seed oil (*Raisio*) was treated at 240° C. with added heptane. The gums contained mostly water (ca. 60%) and some residual triacylglycerols (ca. 20%) from the separation of the hydrated phospholipids (ca. 20%).

226 g of the wet gums was heated together with 200 g heptane at 240° C. for 30 min under 500 rpm mixing in a Parr-reactor as described in Example 1.

The analysis results of the obtained oil can be seen in Table 12. Very pure oil in terms of phosphorus and metal content can be obtained by this treatment. The oil obtained in the treatment with heptane contains a significant amount of TAGs (43%) which is lost to the gums during degumming. The hydrated phospholipids are decomposed to DAG, MAG and FFA.

A brown solid residue could be separated by centrifugation. The solid residue was analysed by IR to be mainly inorganic phosphates. The separated water phase was brown and contained dissolved material from the decomposed phospholipids, however, no fatty acids were identified.

This example indicates that gums, waste from the degumming of vegetable oils, can be heat treated as described and a very pure oil can be obtained without any loss of fatty acids.

TABLE 12

|  |  | Oil from treatment of wet gums with heptane at 240° C. |
|---|---|---|
| TAG | wt-% | 43.1 |
| DAG | wt-% | 25.8 |
| MAG | wt-% | 8.9 |
| FFA | wt-% | 21.9 |
| lipid oligomers | wt-% | 0.3 |
| P | mg/kg | 3.4 |
| Mg | mg/kg | 0.2 |
| Ca | mg/kg | 0.7 |
| Na | mg/kg | 4.1 |
| Fe | mg/kg | 0.9 |

Comparative Example 1

Different oils were treated at high temperature diluted in nonpolar solvent without a polar solvent. Results are presented in table 13.

Same rapeseed oil as in Example 1 was treated at 230° C. diluted in heptane (1:3) without water. After the treatment the oil contained still 11 ppm phosphorus and some magnesium and calcium which were removed in the treatments with water in Example 1.

Same *Nannochloropsis* oil as in Example 4 was treated at 230° C. diluted in heptane (1:3) without adding water. A significantly poorer result was seen when the polar phase was left out entirely. The oil treated without water had 116 ppm phosphorus and 78 ppm sodium remaining in the oil as compared to the results gained (Example 4) when a polar phase was present (P less than 20 ppm, Na less than 10 ppm).

Same soybean oil as in Example 9 was treated at 240° C. diluted in haptane (1:3) without added water. The oil had after the treatment still 16 ppm phosphorus left which would require an additional purification step. In comparison the oil from the treatment with water (Example 8) had very low impurities (under the detection limit, less than 0.5 ppm).

This example demonstrates that significantly more impurities (phosphorus and metals) are left in the oil after thermal treatment if the polar phase is left out entirely.

TABLE 13

|  |  | Comparison to example 1: Rapeseed oil treated diluted in heptane (1:3) at 230° C. | Comparison to example 4: *Nannochloropsis* oil diluted in heptane (1:3) at 230° C. | Comparison to example 9: Soybean oil diluted in heptane (1:3) at 240° C. |
|---|---|---|---|---|
| P | mg/kg | 11.1 | 116 | 16 |
| Mg | mg/kg | 1.6 | 1 | 1.6 |
| Na | mg/kg | <0.5 | 1 | 0.5 |
| Ca | mg/kg | 6.9 | 78 | 3.3 |

Comparative Example 2

The thermal treatment was performed for different oils without dilution in nonpolar solvent. The results are presented in table 14.

Same rapeseed oil as in example 2 was treated as such (without heptane dilution) with water at 230° C. A large decrease in TAGs was seen after the treatment with water (oil-water ratio 1:1). 65% of the TAGs were hydrolysed. When comparing this to the results in Example 2 it is clearly beneficial to have heptane diluting the oil in order to preserve the TAGs.

Same animal fat as in example 8 was also treated at 240° C. with water (without heptane dilution) for comparison. The treatment without heptane dilution at 240° C. resulted in a fat product highly hydrolysed (64.2% free fatty acids, only 7% TAG). When comparing this result to the result in Example 8 for the oil treated at the same conditions but together with heptane, there was much less hydrolysis of the lipids (18.7% FFA and 53% TAGs).

This example demonstrates that when treating the oil to be purified without nonpolar solvent there is a clear increase in hydrolysis of the oil. It is therefore clearly beneficial to treat the oils diluted in e.g. heptane to keep TAGs as unhydrolysed as possible.

TABLE 14

|  |  | Comparison to Example 2: Rapeseed oil treated with water (1:1) at 230° C. | Comparison to Example 8: Animal fat treated with water (1:1) at 240° C. |
| --- | --- | --- | --- |
| TAG | wt-% | 33.7 | 7 |
| DAG | wt-% | 29 | 18.9 |
| MAG | wt-% | 8.6 | 9.6 |
| FFA | wt-% | 28.4 | 64.2 |
| oligomers | wt-% | 0.3 | 0.2 |
| P | mg/kg | <0.6 | 3.2 |
| Ca | mg/kg | 3.8 | 14 |
| Mg | mg/kg | <0.3 | 2.1 |
| Na | mg/kg | <1 | 6.2 |

Comparative Example 3

Same *Nannochioropsis* oil as in Example 5 was as a comparison purified by traditional oil purification treatments degumming and wet bleaching.

The degumming was performed by adding 2500 ppm of citric acid and 2500 ppm of distilled water to the oil under high sheer mixing with an Ultra-Turrax at 8000 rpm for 2 min at 50° C., followed by 15 min mixing at 250 rpm with a magnetic stirrer. 750 ppm NaOH and 3 wt-% water was added to the oil after this. The mixture was mixed at 8000 rpm (Ultra-Turrax) for 2 min and at 250 rpm (magnetic stirrer) for 60 min. Finally the mixture was centrifuged at 50° C. for 30 min and the degummed oil was collected on top.

The degummed oil was after this wet bleached by adding 1000 ppm citric acid and 3000 ppm water followed by 8000 rpm mixing for 2 min and 250 rpm mixing for 15 min. 3 wt-% of bleaching clay was added. The mixture was stirred for 30 min at 80° C. The mixture was then centrifuged for 10 min at 80° C. and the bleached oil was filtered and analysed.

The results are shown in Table 15.

The oil treated by thermal treatment at 230° C. in Example 5 contained only 4 ppm phosphorus and low amounts of magnesium (0.7 ppm) and sodium (2.2 ppm). As a comparison the degummed algal oil contained still half of the phosphorus in the original oil as well as 319 ppm sodium and 72 ppm magnesium. Oil further treated by wet bleaching contained a bit lower amount of phosphorus (175 ppm), sodium (133 ppm) and magnesium (63 ppm), however, considerably more than the thermally treated oil.

This example indicates that the thermal treatment was significantly more effective in removing phosphorus and metal impurities from algal oil than traditional degumming and bleaching procedures routinely used for purification of vegetable oils.

TABLE 15

|  |  | Original algal oil | Oil treated by acid degumming | Oil treated by acid dumming and wet bleaching |
| --- | --- | --- | --- | --- |
| P | mg/kg | 584 | 262 | 175 |
| Ca | mg/kg | 19.2 | 7.9 | 3.5 |
| Na | mg/kg | 483 | 319 | 133 |
| Mg | mg/kg | 219 | 71.8 | 62.9 |

Comparative Example 4

The treatment was performed as a comparison at lower temperatures for certain oils.

The same *Nannochioropsis* oil as in Example 3 was treated at the same dilutions but at room temperature and 100° C.

The same *Rhodococcus* bacterial oil as in Example 7 was treated at the same dilutions but at room temperature and 100° C. The results are shown in Table 16.

This comparative example indicates clearly that wash treatments at lower temperature did not enhance the purification of the oils very significantly.

TABLE 16

|  |  | Nannochloropsis oil treated at RT | Nannochloropsis oil treated at 100° C. | Rhodococcus oil treated at RT | Rhodococcus oil treated at 100° C. |
| --- | --- | --- | --- | --- | --- |
| P | mg/kg | 4800 | 4800 | 107 | 122 |
| Mg | mg/kg | 1400 | 1370 | 63 | 53 |
| Na | mg/kg | 1300 | 910 | 117 | 104 |
| Ca | mg/kg | 867 | 864 | 16 | 15 |

The invention claimed is:

1. A method for purification of lipid material originating from biological material characterized in that said method comprises the steps of
    a. providing said lipid material comprising acylglycerols and phosphorus impurities and at least one added nonpolar solvent and at least one added polar solvent into a reaction zone whereby at least a two phase system comprising a nonpolar phase and a polar phase is formed, and
    b. heating said phase system in the closed reaction zone under mixing at a temperature from 150 ° C. to 300 ° C. and at a pressure wherein said solvents are in subcritical state until the phosphorus impurity is removed from the polar phase, and
    c. separating and recovering from said phase system said nonpolar phase including the purified oil comprising acylglycerols.

2. The method according to claim 1 characterized in that said phosphorus impurities are in the form of phospholipids.

3. The method according to claim 1 characterized in that said biological material comprises plant, animal or microorganism material.

4. The method according to claim 3 characterized in that said plant material is selected from the group of seed oil, vegetable oil, fruit oil and pine oil.

5. The method according to claim 3 characterized in that said animal material comprises rendered animal fat selected from beef, pork, sheep or poultry lard, tallow, butter or fat or mixtures thereof.

6. The method according to claim 3 characterized in that said microorganism material is selected from the group of algae, bacteria, fungi, preferably algae and fungi.

7. The method according to claim 1 characterized in that said lipid material is oil containing residue or waste originating from oil extraction processes.

8. The method according to claim 1 characterized, in that said lipid material further comprises complex lipids selected from glycolipids and sphingolipids.

9. The method according to claim 1 characterized in that said temperature is from 160° C. to 260° C.

10. The method according to claim 1 characterized in that said at least two phase system further comprises a third phase, comprising solid impurities or solid phase residue formed during processing.

11. The method according to claim 1 characterized in that said nonpolar solvent comprises aliphatic or cyclic alkanes of $C_3$-$C_{20}$ or mixtures thereof.

12. The method according to claim 1 characterized in that said polar solvent comprises water.

13. The method according to claim 1 characterized in that said purified oil is recovered dissolved in the nonpolar solvent and the impurities are removed from the nonpolar phase together with the polar phase or as a solid.

14. The method according to claim 1 characterized in that the ratio of said lipid material to said nonpolar solvent is less than 10:1.

15. The method according to claim 1 characterized in that the ratio of the combined amount of said lipid material and nonpolar solvent to polar solvent is more than 1:10.

16. The method according to claim 3 characterized in that said plant material is selected from the group of canola, soybean, palm, cotton, sunflower, camelina, jatropha, corn, hemp and used cooking oil.

17. The method according to claim 1 characterized in that said nonpolar solvent comprises $C_5$-$C_{16}$ alkanes or mixtures thereof.

18. The method according to claim 1 characterized in that said polar solvent comprises a mixture of water and an alcohol readily soluble in water.

19. The method according to claim 1 characterized in that the ratio of said lipid material to said nonpolar solvent is less than 1:1.

* * * * *